Figure 1:
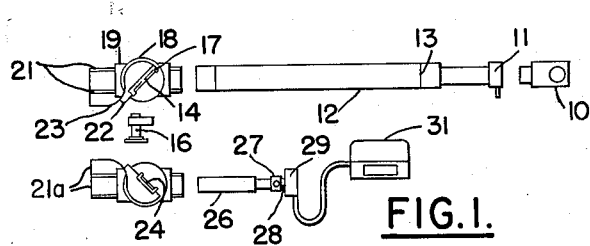

May 10, 1966 R. V. SHACK 3,250,177

IMAGE EVALUATION DEVICE

Filed April 5, 1963

*INVENTOR.*
ROLAND V. SHACK

BY Harry M. Saragovitz,
Edward J. Kelly,
Herbert Berl &
S. Pubroff
ATTORNEYS:

3,250,177
IMAGE EVALUATION DEVICE
Roland Vincent Shack, Twickenham, Middlesex, England, assignor to the United States of America as represented by the Secretary of the Army
Filed Apr. 5, 1963, Ser. No. 271,034
4 Claims. (Cl. 88—56)

This application is a continuation-in-part of my co-pending application entitled Image Evaluation Device, S.N. 56,067, filed Sept. 14, 1960, now abandoned.

The invention described herein may be manufactured and used by or for the Government for governmental purposes without the payment to me of any royalty thereon.

This invention relates to image evaluation devices, and has for its principal object the provision of an improved testing device whereby the quality of an image produced by a telescope may be readily determined by relatively inexperienced personnel.

As will appear, the device is adapted for use as a gage of image quality, the result being indicated on a meter with good-bad ranges somewhat like that used in electronic tube testers. Once set up for a particular type of telescope, the time required to make a complete run on each telescope is only a few minutes.

The invention will be better understood from the following dscription when considered in connection with the accompanying drawings and its scope is indicated by the appended claims.

Referring to the drawings:

FIG. 1 is a block diagram top view indicating the relation between the various parts of the device, FIGS. 2A–2F are a series of curves indicative of the principle of operation of the device.

The telescope tester of FIG. 1 includes a collimator unit and a receiver unit.

The collimator unit includes a light source 10 which uniformly illuminates the object field of a collimator lens, a removable slit 11 which has a fixed width, a collimator 12, a standard flexure plate 13 mounted under the collimator and capable of changing the pointing of the collimator over small vertical and horizontal angles, and a mirror 14 which deflects the collimated beam at approximately right angles, but which, with a combination of translation and cam-controlled rotation can change the angle of incidence of the collimated beam into the entrance pupil of the telescope 16 over the range of the telescope field angle.

To obtain this operation, mirror 14 is mounted in a holder 17 attached to a vertical bearing 18 mounted on a carriage 19 which is slidable on a set of ways 21. As the carriage is moved along the ways, the cam follower 22, which is attached to the mirror holder 17, bears against the cam 23, which is attached to the ways, thereby rotating the mirror about a vertical axis. The cam is so designed that the optical axis of the collimator, after being reflected, passes through the center of the entrance pupil of the telescope for any position of the mirror.

The receiver unit includes a mirror 24 which is similar to the mirror 14 and functions to receive light from the exit pupil of the telescope at any angle and deflect it into the entrance pupil of a receiver decollimator 26 which acts as a collimator in reverse. A viewing eye-piece 27 with a cross-hair reticle mounted on the side of the receiver decollimator 26 is associated with a removable mirror adapted to deflect the image into it. A fine slit or pinhole 28 opens into a photomultiplier 29 which is connected to the amplifier-meter unit 31.

The entire unit is relatively compact. A long collimator is necessary for the precision required. The collimator, the telescope under test, and the receiver decollimator are all in fixed positions. The changing field angle is obtained by the use of the sliding and rotating mirrors which also allow the system to be folded.

Figure 2A:
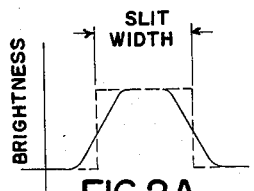
Figure 2D:
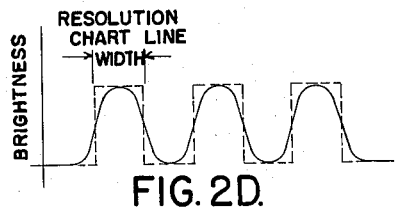
Figure 2B:
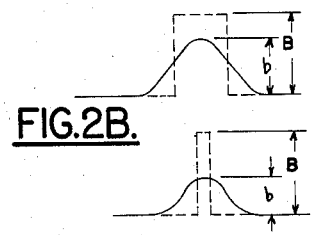
Figure 2C:
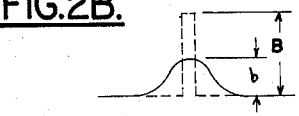

The principle of operation of the device, shown in FIGS. 2A–2C, is based on the properties of the image of a finite width line source. The dotted lines represent the brightness distribution in the image if every object point were imaged as a geometrical point, and the solid lines represent the brightness distribution in the actual image where each object point is imaged as a spot light with finite dimensions. If the object line is wide enough, see FIG. 2A, the image is uniformly bright in the central region and only near the edges does the brightness diminish. The brightness in the center is independent of the width of the line. However, when the object line width is small enough, see FIGS. 2B and 2C, the brightness at the center of the image drops below its maximum brightness and becomes a function of the line width.

Figure 2E:
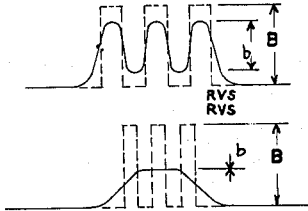
Figure 2F:
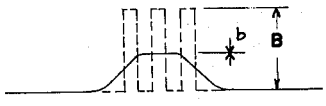

This is analogous to what happens when the object is a resolution chart, as shown in FIGS. 2D–2F. If the pattern is coarse enough, the contrast between the lines and spaces in the image is a maximum and does not vary as the pattern is changed, as shown in FIG. 2D. When the pattern is small enough, however, the contrast in the image between the lines and spaces is reduced and this contrast becomes a function of the pattern size, as shown in FIG. 2E. The limit of resolution is reached when the contrast is so low that it is not possible to distinguish lines from spaces. See FIG. 2F.

Normally the image quality of a telescope is judged visually by estimating the limit of resolution with the aid of a resolution chart as a test object. This has the disadvantage that experienced personnel are required to make the test, and that precision is low because it is a threshold phenomenon which is being observed. In addition, it is possible for the resolution to be adequate but the contrast poor, thus making it possible for an inferior telescope to be passed as equivalent to a good telescope. This invention is intended to overcome all three of these disadvantages.

In the use of the device, the procedure is as follows:

(1) Place telescope 16 in position, and slide mirrors 14 and 24 to their zero position.

(2) Focus decollimator 26 on slit and adjust collimator 12 pointing screws to center slit image on telescope 16 crosshairs.

(3) Remove slit 11, swing eyepiece 27 out, adjust photometer to read 100% and replace slit.

(4) Adjust proper collimator pointing screw to give highest reading on the photometer. This is the contrast factor for this orientation of the slit. If the reading is below a predetermined tolerance level, reject the telescope. If the reading is above said level, testing may continue.

(5) Rotate slit 90 degrees and repeat step 4. This gives the contrast factor for the perpendicular orientation (e.g. radial and tangential).

(6) Slide mirror 14 to some predetermined field angle position.

(7) Swing eyepiece 27 into place and slide mirror 24 until slit-image is centered on crosshairs and focus telescope on slit.

(8) Repeat steps 3, 4 and 5.

None of the operations enumerated above are intricate—no critical judgment is necessary other than the ability to focus visually on a line image. The present invention thus makes it possible for relatively inexperienced personnel to gage the image quality of a telescope.

I claim:

1. In a device for testing the image quality of a telescope, the combination of means for defining a light beam in the form of a removeable slit of fixed finite width, means for collimating said light, first adjustable means for moving said collimated light beam to scan the field of said telescope, said first adjustable means including a pair of parallel ways, a carriage slidable on said ways, a reflector rotatably mounted on said carriage to rotate on an axis perpendiculr to said ways, mechanical means interposed between said reflector and said ways to rotate said reflector upon movement of said carriage, whereby the light beam from said collimator is reflected into the center of the entrance pupil of said telescope, a second adjustable means for deflecting said light beam into a decollimating system, a sampling aperture, said decollimating system forming a real image in the plane of said sampling aperture, and means for measuring the amount of light passing through the sampling aperture by photoelectric photometry.

2. In a device for testing the image quality of a telescope, the combination of means for defining a light beam in the form of a removable slit of fixed finite width, means for collimating said light, first adjustable means for moving said collimated light beam to scan the field of said telescope, said first adjustable means including a first pair of parallel ways, a carriage slidable on said ways, a reflector rotatably mounted on said carriage to rotate on an axis perpendicular to said ways, mechanical means interposed between said reflector and said ways to rotate said reflector upon movement of said carriage, whereby the light beam from said collimator is reflected into the center of the entrance pupil of said telescope, a second adjustable means for deflecting said light beam into a decollimating system, said second adjustable means including a second pair of parallel ways parallel to said first pair of parallel ways, a carriage slidable on said ways, a reflector rotatably mounted on said carriage to rotate on an axis perpendicular to said ways, mechanical means interposed between said reflector and said ways to rotate said reflector upon movement of said carriage, whereby the light beam for the exit pupil of said telescope is reflected into the entrance pupil of said decollimator for any position of said carriage, a sampling aperture, said decollimating system forming a real image in the plane of said sampling aperture, and means for measuring the amount of light passing through the sampling aperture by photoelectric photometry.

3. In a device for testing the image quality of a telescope, the combination of means for defining a light beam in the form of a removable slit of fixed finite width, means for collimating said light, first adjustable means for moving said collimated light beam to scan the field of said telescope, said first adjustable means including a pair of parallel ways, a carriage slidable on said ways, a reflector rotatably mounted on said carriage to rotate on an axis perpendicular to said ways, cam means interposed between said reflector and said ways to rotate said reflector upon movement of said carriage, whereby the light beam from said collimator is reflected into the center of the entrance pupil of said telescope, a second adjustable means for deflecting said light beam into a decollimating system, a sampling aperture, said decollimating system forming a real image in the plane of said sampling aperture, and means for measuring the amount of light passing through the sampling aperture by photoelectric photometry.

4. In a device for testing the image quality of a telescope, the combination of means for defining a light beam in the form of a removable slit of fixed finite width, means for collimating said light, first adjustable means for moving said collimated light beam to scan the field of said telescope, said first adjustable means including a first pair of parallel ways, a carriage slidable on said ways, a reflector rotatably mounted on said carriage to rotate on an axis perpendicular to said ways, cam means interposed between said reflector and said ways to rotate said reflector upon movement of said carriage, whereby the light beam from said collimator is reflected into the center of the entrance pupil of said telescope, a second adjustable means for deflecting said light beam into a decollimating system, said second adjustable means including a second pair of parallel ways parallel to said first pair of parallel ways, a carriage slidable on said ways, a reflector rotatably mounted on said carriage to rotate on an axis perpendicular to said ways, cam means interposed between said reflector and said ways to rotate said reflector upon movement of said carriage, whereby the light beam for the exit pupil of said telescope is reflected into the entrance pupil of said decollimator for any position of said carriage, a sampling aperture, said decollimating system forming a real image in the plane of said sampling aperture, and means for measuring the amount of light passing through the sampling aperture by photoelectric photometry.

References Cited by the Examiner

UNITED STATES PATENTS

| | | | |
|---|---|---|---|
| 1,952,337 | 3/1934 | Simjian | 88—74 X |
| 2,041,127 | 5/1936 | Gray. | |
| 2,365,361 | 12/1944 | Street | 88—33 X |
| 2,684,011 | 7/1954 | Smith et al. | 88—56 X |

FOREIGN PATENTS

| | | |
|---|---|---|
| 907,358 | 3/1954 | Germany. |

OTHER REFERENCES

Archard et al.: "An Optical Scanning and Recording System for a Photo-Electric Optical Bench," Electronic Engineering, vol. 29, May 1957, pp. 231–233.

Herriott, "A Photoelectric Lens Bench," Journal of the Optical Society of America, vol. 37, No. 6, June 1947, pp. 472–474.

Shack et al.: "A New Device for the Photoelectric Examination of an Aerial Image," Journal of the Optical Society of America, vol. 42, 1952, p. 874.

JEWELL H. PEDERSEN, *Primary Examiner.*

T. L. HUDSON, *Assistant Examiner.*